US012696886B2

(12) United States Patent
Mayer

(10) Patent No.: US 12,696,886 B2
(45) Date of Patent: Aug. 4, 2026

(54) FISHING LURE-FISHING LINE CONNECTION SYSTEM

(71) Applicant: Michael Mayer, Günzburg (DE)

(72) Inventor: Michael Mayer, Günzburg (DE)

( * ) Notice: Subject to any disclaimer, the term of this patent is extended or adjusted under 35 U.S.C. 154(b) by 0 days.

(21) Appl. No.: 19/189,918

(22) Filed: Apr. 25, 2025

(65) Prior Publication Data

US 2025/0359538 A1     Nov. 27, 2025

(30) Foreign Application Priority Data

May 22, 2024     (DE) .......................... 102024114375.4

(51) Int. Cl.
A01K 85/00          (2006.01)

(52) U.S. Cl.
CPC ...... A01K 85/1867 (2022.02); A01K 85/1811 (2022.02); A01K 85/1837 (2022.02)

(58) Field of Classification Search
CPC ............ A01K 85/1867; A01K 85/1811; A01K 85/1837
See application file for complete search history.

(56) References Cited

U.S. PATENT DOCUMENTS 153,854 A * 8/1874 Skinner ................... A01K 85/14
43/42.49
281,083 A * 7/1883 Kessler ................... A01K 85/16
43/42.19

973,246 A * 10/1910 Aagaard ................ A01K 85/12
43/44.6
1,093,980 A * 4/1914 Donaly .................. A01K 85/18
43/42.15
1,351,669 A * 8/1920 Mansfield ............. F16B 45/036
24/601.3

(Continued)

FOREIGN PATENT DOCUMENTS

CA          3004994 A1 * 11/2019 ............. A01K 85/10
DE   102020133310 B3 * 9/2021 ............. A01K 85/10

(Continued)

OTHER PUBLICATIONS

Zeck Fishing, Tungsten Rushka, retreived from https://www.zeck-fishing.com/tungsten-rushka-9637310031, downloaded on Jan. 9, 2025.

(Continued)

*Primary Examiner* — Morgan T Jordan
(74) *Attorney, Agent, or Firm* — Hamilton, Brook, Smith & Reynolds, P.C.

(57) ABSTRACT

The invention relates to a fishing lure-fishing line connection system for connecting a fishing line to a fishing lure, wherein at least three eyelets are provided on a weight body. A hanging weight eyelet is provided for attaching a hanging weight, a fishing lure eyelet is provided for attaching a fishing lure, in particular in the form of an artificial lure, and a fishing line eyelet is provided for attaching a fishing line. The eyelets are stationary relative to one another. The hanging weight eyelets and the fishing lure eyelet are configured as open quick-release eyelets which are self-locking to prevent unintentional unhooking, and wherein the weight body is arranged between the fishing lure eyelet and the fishing line eyelet.

13 Claims, 2 Drawing Sheets

(56) References Cited

U.S. PATENT DOCUMENTS

| | | | | |
|---|---|---|---|---|
| 1,419,540 | A * | 6/1922 | Brown | A01K 85/02 43/42.42 |
| 1,522,451 | A * | 1/1925 | Hayes | A01K 85/10 43/43.13 |
| 2,228,591 | A * | 1/1941 | Brown | A01K 85/16 43/44.8 |
| 2,290,702 | A * | 7/1942 | Nelson | A01K 85/16 43/42.36 |
| 2,295,292 | A * | 9/1942 | Rogers | A01K 85/16 43/42.34 |
| 2,309,902 | A * | 2/1943 | Harvey | A01K 85/08 43/42.34 |
| 2,375,290 | A * | 5/1945 | Docteur | A01K 85/14 D22/128 |
| 2,486,635 | A * | 11/1949 | Coats | A01K 85/10 24/601.3 |
| 2,495,021 | A * | 1/1950 | Pruden | A01K 85/16 43/42.23 |
| 2,536,553 | A * | 1/1951 | La Fleur | A01K 85/16 43/42.36 |
| 2,570,404 | A * | 10/1951 | Stirlen | A01K 85/14 43/42.32 |
| 2,603,902 | A * | 7/1952 | Stanwyck | A01K 85/16 43/42.36 |
| 2,608,789 | A * | 9/1952 | Stone | A01K 85/16 43/42.36 |
| 2,700,809 | A * | 2/1955 | Caldwell | A01K 85/16 43/42.49 |
| 2,760,293 | A * | 8/1956 | Rupp | A01K 85/16 43/42.42 |
| 3,131,504 | A * | 5/1964 | Haulk | A01K 85/10 43/42.4 |
| 3,996,688 | A * | 12/1976 | Hardwicke, III | A01K 85/00 43/42.11 |
| 4,090,317 | A * | 5/1978 | Skwirut | A01K 85/16 43/42.36 |
| 4,133,135 | A * | 1/1979 | Miles | A01K 85/00 43/42.13 |
| 4,201,008 | A * | 5/1980 | Sparkman | A01K 85/00 D22/128 |
| 4,219,956 | A * | 9/1980 | Hedman | A01K 85/00 D22/127 |
| 4,468,880 | A * | 9/1984 | Olszewski | A01K 85/16 43/42.08 |
| 4,671,007 | A * | 6/1987 | Stanczyk | A01K 85/00 43/42.11 |
| 4,761,910 | A * | 8/1988 | Ninomiya | A01K 85/16 43/42.22 |
| 4,819,366 | A * | 4/1989 | Manno | A01K 85/00 43/42.39 |
| 5,038,512 | A * | 8/1991 | Gaal | A01K 85/10 43/42.47 |
| 5,090,151 | A * | 2/1992 | Salminen | A01K 85/00 43/42.36 |
| 5,203,106 | A * | 4/1993 | Huppert | A01K 85/00 43/42.38 |
| 5,233,785 | A * | 8/1993 | Ching | A01K 85/16 43/42.36 |
| 5,339,559 | A * | 8/1994 | Strobbe | A01K 85/00 43/44.8 |
| 5,373,658 | A * | 12/1994 | Huppert | A01K 85/00 43/43.16 |
| 5,926,995 | A * | 7/1999 | Dubois | A01K 85/01 43/42.31 |
| 6,101,758 | A * | 8/2000 | Finley | A01K 85/16 43/42.22 |
| 6,354,037 | B2 * | 3/2002 | Coppola, Jr. | A01K 85/01 43/42.06 |
| 6,772,553 | B2 * | 8/2004 | Phillips | A01K 85/02 43/44.8 |
| 7,197,846 | B1 * | 4/2007 | Gibson | A01K 85/12 43/42.11 |
| 8,656,633 | B2 * | 2/2014 | Renosky | A01K 85/00 43/42.22 |
| 10,834,909 | B1 * | 11/2020 | Rye | A01K 85/10 |
| 10,993,422 | B1 * | 5/2021 | Maji | A01K 85/1821 |
| 2002/0104251 | A1 * | 8/2002 | Prescott | A01K 85/00 43/42.48 |
| 2003/0019146 | A1 * | 1/2003 | McNally | A01K 85/00 43/42.13 |
| 2003/0074828 | A1 * | 4/2003 | Sprouse | A01K 85/10 43/42.13 |
| 2003/0233782 | A1 * | 12/2003 | Routsaw | A01K 85/00 43/42.13 |
| 2004/0006908 | A1 * | 1/2004 | Essad | A01K 85/00 43/42.13 |
| 2005/0166444 | A1 * | 8/2005 | Taylor | A01K 85/14 43/42.13 |
| 2007/0006517 | A1 * | 1/2007 | Grimaldi | A01K 85/00 43/42.19 |
| 2007/0062094 | A1 * | 3/2007 | Senter | A01K 85/00 43/17.6 |
| 2008/0000139 | A1 * | 1/2008 | Selvaggio | A01K 91/06 43/42.06 |
| 2010/0126058 | A1 * | 5/2010 | Hughes | A01K 85/16 43/42.47 |
| 2010/0313463 | A1 * | 12/2010 | Coxey | A01K 85/00 43/44.8 |
| 2011/0232156 | A1 * | 9/2011 | Burdick | A01K 85/16 43/42.35 |
| 2012/0023805 | A1 * | 2/2012 | Thorne | A01K 85/14 43/42.53 |
| 2013/0097915 | A1 * | 4/2013 | Tamburro | A01K 85/00 43/43.16 |
| 2013/0160347 | A1 * | 6/2013 | Thome | A01K 85/00 43/42.39 |
| 2013/0192121 | A1 * | 8/2013 | Ford | A01K 85/00 43/42.22 |
| 2014/0190065 | A1 * | 7/2014 | Ulianov | A01K 85/12 43/42.19 |
| 2015/0007483 | A1 * | 1/2015 | Thorne | A01K 85/16 43/42.39 |
| 2015/0033612 | A1 * | 2/2015 | Stokes | A01K 83/00 43/42.1 |
| 2016/0106081 | A1 * | 4/2016 | Thorne | A01K 91/04 43/42.39 |
| 2017/0042134 | A1 * | 2/2017 | Sandefur | A01K 85/10 |
| 2017/0099822 | A1 * | 4/2017 | Thorne | A01K 85/12 |
| 2018/0332837 | A1 * | 11/2018 | Morrow | A01K 85/12 |
| 2019/0166813 | A1 * | 6/2019 | VanZant | A01K 85/10 |
| 2019/0261614 | A1 * | 8/2019 | Olsen | A01K 91/04 |
| 2019/0313617 | A1 * | 10/2019 | Coxey | A01K 85/14 |
| 2021/0282381 | A1 * | 9/2021 | Hancock | A01K 85/10 |
| 2021/0386043 | A1 * | 12/2021 | Yamane | A01K 85/1837 |
| 2022/0132820 | A1 * | 5/2022 | Willey | A01K 95/00 43/42.39 |
| 2022/0217958 | A1 * | 7/2022 | Olsen | A01K 85/1863 |
| 2022/0295768 | A1 * | 9/2022 | Embry | A01K 85/1877 |
| 2022/0304293 | A1 * | 9/2022 | Reed | A01K 85/1811 |
| 2022/0378027 | A1 * | 12/2022 | Kawasaki | A01K 85/16 |
| 2022/0394963 | A1 * | 12/2022 | Yukitomo | A01K 85/1867 |
| 2024/0324565 | A1 * | 10/2024 | Jansen | A01K 85/1837 |

FOREIGN PATENT DOCUMENTS

| | | | | |
|---|---|---|---|---|
| DE | 202022000808 | U1 * | 9/2022 | A01K 91/04 |
| DE | 102022204704 | A1 * | 12/2022 | A01K 85/1847 |
| DE | 202024102577 | U1 * | 5/2024 | A01K 95/02 |
| DE | 202024102648 | U1 * | 6/2024 | A01K 91/04 |
| EP | 2486792 | A1 * | 8/2012 | A01K 91/06 |
| EP | 4252532 | A1 * | 10/2023 | A01K 85/16 |
| FR | 2652991 | A1 * | 4/1991 | A01K 85/18 |
| GB | 2477430 | A | 8/2011 | |
| JP | 2020145942 | A * | 9/2020 | A01K 91/03 |
| KR | 20080045619 | A * | 5/2008 | A01K 85/1837 |
| KR | 20180001638 | U * | 6/2018 | A01K 95/00 |
| KR | 20180003158 | U * | 11/2018 | A01K 85/08 |

(56) References Cited

FOREIGN PATENT DOCUMENTS

WO    WO-2013043144 A1 *   3/2013  ............. A01K 85/14
WO    WO-2024217664 A1 *   10/2024  ......... A01K 85/1867

OTHER PUBLICATIONS

Camo-Tackle, Camo Flexible Head—Black, retrieved from https://www.camo-tackle.de/CAMO-Flexible-Head-BLACK, downloaded on Jan. 9, 2025.
HechtundBarsch.de, Musaga Jighaken Classic #1—Großpackung (25 Jigköpfe). retrieved from https://www.hechtundbarsch.de/products/musaga-jighaken-classic-1-grosspackung-25-jigkopfe, downloaded on Jan. 9, 2025.
Camo-Tackle, Decoy Zero-Dan Worm217—Gr. 2/0 (5.0g), retrieved from https://www.camo-tackle.de/ZERO-Dan-Worm217-Gr-2-0-50g, downloaded on Jan. 9, 2025.
Pikecraft Fishing, The System SET2 Heavy (2x The System & 2 Wechselbleie [30 & 40g]) Shallow Screw System, retrieved from https://pikecraft.de/p/the-system-set2-heavy-2x-the-system-und-2-wechselbleie-30-und-40g-shallow-screw-system, downloaded on Jan. 9, 2025.
https://raventackle.com/product/raven-3-way-snap-swivels/ archived at URL: https://web.archive.org/web/2024020221 02 04/https://raventrackle.com/product/raven-3-way-snap-swivels/ on Feb. 2, 2024 (14 pages).

* cited by examiner

FISHING LURE-FISHING LINE CONNECTION SYSTEM

RELATED APPLICATION

This application claims priority under 35 U.S.C. § 119 or 365 to German Application No. 102024114375.4 filed May 22, 2024. The entire teachings of the above application are incorporated herein by reference.

BACKGROUND

A fishing lure can be connected to a fishing line with a connection system. Previous assemblies and systems for artificial fishing lures were associated with greater effort to be able to quickly change the additional weight for weighting or alternatively the hook/bait. With state-of-the-art artificial fishing lures, a weight can indeed at times be changed; however, a metal clip needs to be removed from the weight and be replaced with another weight.

SUMMARY

Embodiments of the invention provide an improved fishing lure-fishing line connection system for connecting a fishing line to a fishing lure, which is more convenient and faster to use.

According to an embodiment, a fishing lure-fishing line connection system for connecting a fishing line to a fishing lure includes at least three eyelets that are provided on a weight body. The eyelets include a hanging weight eyelet that is provided for attaching a hanging weight, a fishing lure eyelet that is provided for attaching a fishing lure, in particular in the form of an artificial lure, e.g., a rubber bait, and a fishing line eyelet that is provided for attaching a fishing line. The eyelets are stationary relative to one another. The hanging weight eyelet and the fishing lure eyelet are configured as open quick-change eyelets which are self-locking to prevent unintentional unhooking. The weight body is arranged between the fishing lure eyelet and the fishing line eyelet.

Advantageously, the eyelets can be formed from wire. For example, the eyelets can be formed from a single wire and can be guided through the weight body. The fishing line eyelet can be configured as a closed eyelet.

Advantageously, the free end of the wire forming the hanging weight eyelet and/or the free end of the wire forming the fishing lure eyelet can be bent towards the fixed end, so that the gap formed is narrower than the material of an eyelet of a hanging weight and/or a fishing lure to be hooked in.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
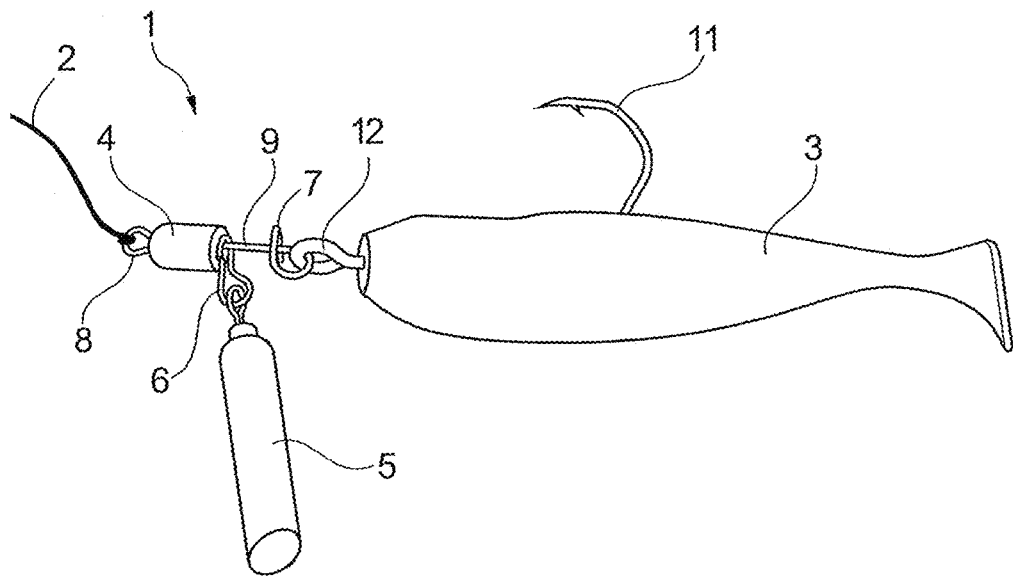
FIG. 1 shows a schematic representation of a fishing lure-fishing line connection system according to the invention with a fishing lure.

A description of example embodiments follows.

The invention relates to a fishing lure-fishing line connection system for connecting a fishing line to a fishing lure.

The most common form of artificial fishing lures are soft plastic lures rigged with a jig head hook which have the great disadvantage of only being able to fish with one weight and also only with one hook shape. Typically, only single hooks or offset hooks are present here. These soft plastic lures are then firmly attached to the jig head hook and users are required to carry a larger piece of fishing equipment with them in order to be able to operate in a flexible manner. The common jig head hook with the 90-degree angle between fishing line and hook also poses the problem of tear offs under water since the jig head easily gets wedged in gaps between rocks and gets stuck. With jig heads, one requires a jig head for every soft plastic bait; with different colors and weights of 3 g, 5 g, 7 g, 10 g, 12 g, etc., one requires a large quantity of jigs and lures to cover every fishing situation. This conventional method is very cost and material intensive. The conventional systems (assemblies) are not flexible and there is moreover a higher risk of tear offs of the assemblies which then end up in the water. This is also an environmental problem, not only because of the lead weights that are normally used.

Embodiments of the invention provide an improved fishing lure-fishing line connection system for connecting a fishing line to a fishing lure, which is more convenient and faster to use.

According to an embodiment of the invention, a fishing lure-fishing line connection system is provided for connecting a fishing line to a fishing lure, wherein at least three eyelets are provided on a weight body, wherein a hanging weight eyelet is provided for attaching a hanging weight, a fishing lure eyelet is provided for attaching a fishing lure, in particular in the form of a rubber bait, and a fishing line eyelet is provided for attaching a fishing line, wherein the eyelets are stationary relative to one another, wherein the hanging weight eyelet and the fishing lure eyelet are configured as open quick-change eyelets which are self-locking to prevent unintentional unhooking, wherein the weight body is arranged between the fishing lure eyelet and the fishing line eyelet.

This is a particularly effective way of providing a system for artificial lures in which one can quickly change the shape/color and weight of different hook-on weights without needing to open a carabiner or snap ring, or alternatively one is no longer needed due to the design. The invention makes anglers more flexible, as the different weights and interchangeable soft plastic lures/metal lures allow them to reduce the amount of fishing tackle they need to carry with them when angling, as well as the overall amount of tackle. With conventional systems on the market, it is more complex to change the weight for certain running depths and running patterns, and one usually needs considerably more equipment.

Advantageously, the eyelets are formed from wire and, according to a further preferred configuration of the invention, the eyelets are formed from a single wire and are guided through the weight body, wherein the fishing line eyelet is configured as a closed eyelet.

It is advantageous to select a spring-elastic or rigid wire.

A further advantageous configuration of the invention provides that the free end of the wire forming the hanging weight eyelet and/or the free end of the wire forming the fishing lure eyelet is bent towards the fixed end, so that the gap formed is narrower than the material of an eyelet of a hanging weight and/or a fishing lure to be hooked in.

In the accompanying drawings, identical reference numbers in the figures denote identical or identically acting elements.

Figure 2:
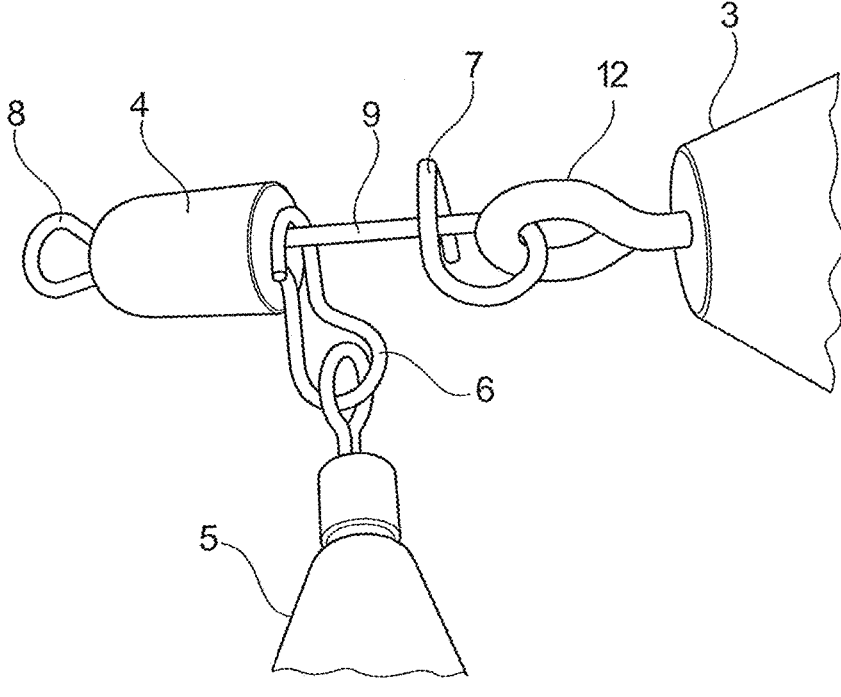
FIG. 2 shows a detailed representation of the system from FIG. 1.

FIG. 1 and the detailed illustration according to FIG. 2 show a fishing lure-fishing line connection system 1 for connecting one fishing line 2 to one fishing lure 3. Three eyelets are provided on a weight body 4.

A hanging weight eyelet 6, for attaching a hanging weight 5, a fishing lure eyelet 7, for attaching a fishing lure 3, in the form of a rubber fish, and a fishing line eyelet 8, for attaching a fishing line 2.

The rubber lure accommodates the hook 11, which at its end forms the hook eyelet 12 that interacts with the fishing lure eyelet 7. The hanging weight 5 can be selected according to the desired submergence depth. It is advantageous for the environment to choose lead-free weights.

The weight body 4 improves the position of the fishing lure 3 in relation to a fishing line 2 attached to the fishing line eyelet 8.

The eyelets 6, 7, 8 are positionally fixed in relation to each other, which is to say, they are rigidly connected to each other.

In order to make an easier switch in components, the hanging weight eyelet 6 and the fishing lure eyelet 7 are configured as open quick-change eyelets that are self-locking to prevent unintentional unhooking.

The weight body 4 is arranged between fishing lure eyelet 7 and fishing line eyelet 8 and forms a line in the example shown (coaxial arrangement).

In the example shown, all eyelets (6, 7, 8) are formed in one piece from a single wire 9. The wire 9 is guided through the weight body 4, wherein the fishing line eyelet 8 is configured as a closed eyelet (turning point of the wire).

Figure 3:
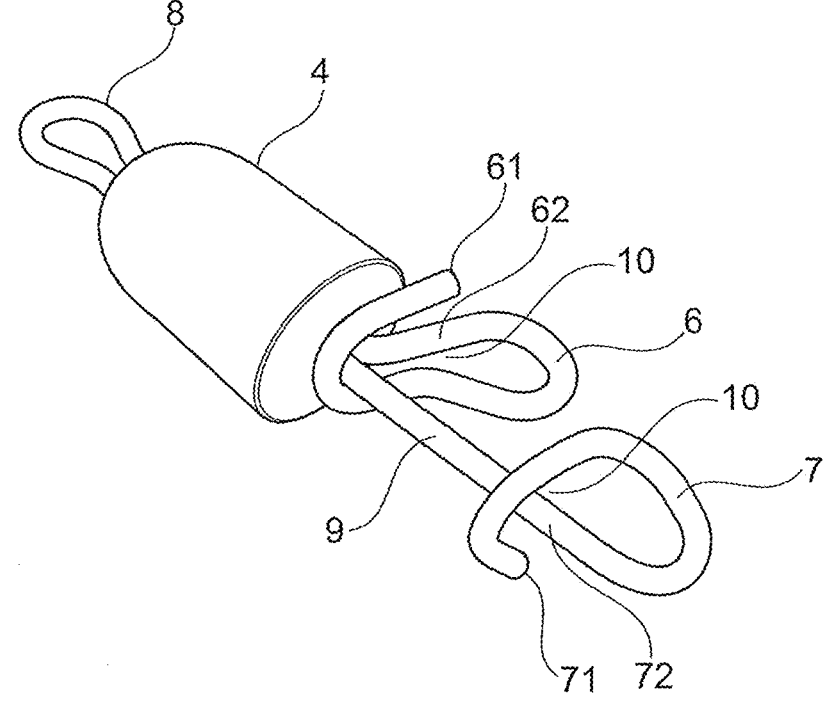
FIG. 3 shows a top view of the fishing lure-fishing line connection system from FIG. 1.
Figure 4:
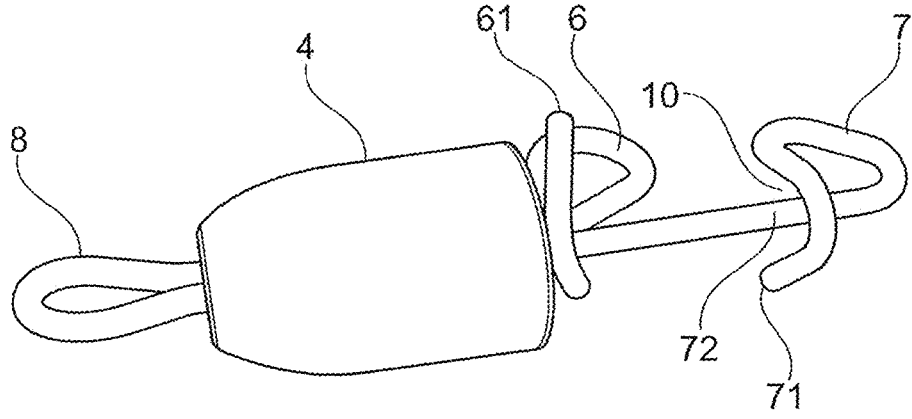
FIG. 4 shows a top view of the fishing lure-fishing line connection system from FIG. 3 from a different angle.

In order to form the convenient quick-change eyelets, a more detailed illustration is once again shown in FIG. 3 and FIG. 4. The free end 61 of the wire 9 forming the hanging weight eyelet 6 and/or the free end 71 of the wire 9 forming the fishing lure eyelet 7 is bent towards the fixed end 62 or alternatively 72 so that the gap 10 formed is narrower than the material of an eyelet of a hanging weight 5 and/or fishing lure 3 to be hooked in. As a result, the hooked-in eyelet—be it that of the hook built into the bait or the hanging weight—remains secured but can again easily be released from the system with a counterpressure.

By means of the interaction with a hanging weight used to weigh down the rubber bait in the water, it is possible to react to any need for a "conversion."

The angler can react much more flexibly and quickly on the water and can adapt their fishing lure quickly and easily to the water, water turbidity, river speed, external light conditions, season, type of fish, and bottom conditions.

The amount of fishing tackle of all kinds of artificial lures (rubber fish, twisters, pintails, creature baits, crayfish, etc.) and weights is reduced considerably, as the weight can be adapted to the situation and the artificial lure can be changed just as quickly. Various hooks such as, for example, offset hooks can also be hooked in and this gives one the opportunity to catch fish in very difficult to fish waters with underwater obstacles such as trees or large stones, as these hooks do not get caught in obstacles so easily because the hook is embedded in the bait.

The various interchangeable weights can be made from a wide range of materials and weight classes. As the environmental friendliness of fishing lures is playing an increasingly important role and is even prescribed in some countries, environmentally friendly weights such as tungsten can also be hooked in here. In this way, the angler can decide for themself what type of weights they want to use.

Vertical fishing is also possible with the system, in this case, heavier weights are then usually required depending on the depth, current speed, and drift speed of the boat.

This flexibility makes the system much cheaper than the previous alternatives, as the angler can use any lure with one system and choose any weight. In this way, the angler needs to buy and carry far fewer weights/hooks and lures.

With the different shapes and sizes of the weights, one can also influence the run and behavior of the fishing lure, which is suitable to get certain species of fish to bite, depending on the season and the form on the day of the fish. The special design of the system also means that weeds, leaves or other debris in the water do not easily collect on the system.

By selecting an elongated weight and an offset hook, one can drop the system even in very vegetation-rich zones and catch fish directly in obstacles. The design also makes it possible to fish without the hanging weight and bait becoming entangled.

The system also has the advantage that metal lures such as chatterbaits and spinner baits, etc. can be hooked into it and the running depth and running pattern can be determined by the interchangeable hanging weight.

Embodiments of the invention can be used by anglers all over the world for various predatory fish species such as pike, pike perch, perch, black bass, catfish, and many more.

FIG. 3 and FIG. 4 show a top view of the fishing lure-fishing line connection system on its own from different angles, wherein the hanging weight eyelet 6 and the fishing lure eyelet 7 are shown with their free ends 61 and 71, respectively, and their fixed ends 62 and 72, respectively, next to the fishing line eyelet 8 and the weight body 4.

While example embodiments have been particularly shown and described, it will be understood by those skilled in the art that various changes in form and details may be made therein without departing from the scope of the embodiments encompassed by the appended claims.

What is claimed is:

1. A fishing lure-fishing line connection system for connecting a fishing line to a fishing lure, comprising:
   at least three eyelets provided on a weight body, wherein the eyelets include a hanging weight eyelet provided for attaching a hanging weight, a fishing lure eyelet provided for attaching a fishing lure, and a fishing line eyelet provided for attaching a fishing line,
   wherein the eyelets are stationary relative to one another,
   wherein the hanging weight eyelet and the fishing lure eyelet are configured as open quick-change eyelets which are self-locking to prevent unintentional unhooking, and
   wherein the weight body is arranged between the fishing lure eyelet and the fishing line eyelet.

2. The fishing lure-fishing line connection system according to claim 1, wherein the eyelets are formed from wire.

3. The fishing lure-fishing line connection system according to claim 2, wherein the eyelets are formed from a single wire guided through the weight body, wherein the fishing line eyelet is configured as a closed eyelet.

4. The fishing lure-fishing line connection system according to claim 3, wherein the free end of the wire forming the hanging weight eyelet and/or the free end of the wire forming the fishing lure eyelet is bent towards the fixed end, so that the gap formed is narrower than the material of an eyelet of a hanging weight and/or fishing lure to be hooked in.

5. The fishing lure-fishing line connection system according to claim 2, wherein the free end of the wire forming the hanging weight eyelet is bent towards the fixed end, so that the gap formed is narrower than the material of an eyelet of a hanging weight to be hooked in.

6. The fishing lure-fishing line connection system according to claim 2, wherein the free end of the wire forming the fishing lure eyelet is bent towards the fixed end, so that the gap formed is narrower than the material of an eyelet of a fishing lure to be hooked in.

7. The fishing lure-fishing line connection system according to claim 6, wherein the free end of the wire forming the hanging weight eyelet is bent towards the fixed end, so that the gap formed is narrower than the material of an eyelet of a hanging weight to be hooked in.

8. The fishing lure-fishing line connection system according to claim 1, wherein the fishing lure is in the form of an artificial lure.

9. The fishing lure-fishing line connection system according to claim 8, wherein the artificial lure is a rubber bait.

10. The fishing lure-fishing line connection system according to claim 1, wherein the eyelets are formed from a single wire, one free end of the wire forming the hanging weight eyelet and another free end of the wire forming the fishing lure eyelet.

11. The fishing lure-fishing line connection system according to claim 10, wherein the fishing lure eyelet is a turning point in the single wire.

12. The fishing lure-fishing line connection system according to claim 10, wherein the weight body is positioned between the fishing lure eyelet and the free ends of the wire.

13. The fishing lure-fishing line connection system according to claim 10, wherein the single wire is guided through the weight body.

\* \* \* \* \*